US010946889B2

United States Patent
Appleyard et al.

(10) Patent No.: US 10,946,889 B2
(45) Date of Patent: Mar. 16, 2021

(54) RETRACTABLE STEER-BY-WIRE STEERING COLUMN

(71) Applicant: TRW Limited, Solihull (GB)

(72) Inventors: Michael Appleyard, Cheltenham (GB); Niclas Davies, Birmingham (GB)

(73) Assignee: ZF Automotive UK Limited

( * ) Notice: Subject to any disclaimer, the term of this patent is extended or adjusted under 35 U.S.C. 154(b) by 44 days.

(21) Appl. No.: 16/658,188

(22) Filed: Oct. 21, 2019

(65) Prior Publication Data

US 2020/0172149 A1 Jun. 4, 2020

(30) Foreign Application Priority Data

Nov. 29, 2018 (GB) ...................... 1819461

(51) Int. Cl.
*B62D 1/19* (2006.01)
*B62D 1/181* (2006.01)
*B62D 1/185* (2006.01)

(52) U.S. Cl.
CPC ............. *B62D 1/192* (2013.01); *B62D 1/181* (2013.01); *B62D 1/185* (2013.01)

(58) Field of Classification Search
CPC ........ B62D 1/192; B62D 1/181; B62D 1/185; B62D 1/195
See application file for complete search history.

(56) References Cited

U.S. PATENT DOCUMENTS

| 9,428,215 | B1* | 8/2016 | Nagatani | B62D 1/195 |
| 9,828,019 | B2* | 11/2017 | Dubay | B62D 1/195 |
| 2006/0181070 | A1* | 8/2006 | Imamura | B62D 1/195 280/777 |
| 2012/0024101 | A1 | 2/2012 | Schnitzer et al. | |
| 2015/0128752 | A1 | 5/2015 | Buzzard et al. | |
| 2016/0159387 | A1* | 6/2016 | Okano | B62D 1/184 74/493 |
| 2016/0368524 | A1* | 12/2016 | Tinnin | B62D 1/192 |
| 2019/0100242 | A1* | 4/2019 | Bodtker | B62D 7/22 |
| 2019/0176870 | A1* | 6/2019 | Ganahl | B62D 1/185 |
| 2020/0031382 | A1* | 1/2020 | Strong | B62D 1/184 |
| 2020/0398885 | A1* | 12/2020 | Pichonnat | B62D 1/192 |
| 2020/0406952 | A1* | 12/2020 | Gosztyla | B62D 1/185 |

FOREIGN PATENT DOCUMENTS

WO 2018064161 A1 4/2018

* cited by examiner

*Primary Examiner* — Drew J Brown
(74) *Attorney, Agent, or Firm* — Robert James Harwood

(57) ABSTRACT

A steering column for a vehicle includes a telescopic mechanism, a first electrically powered linear actuator, and a means for absorbing the impact energy transmitted between a driver and the steering wheel in a crash. The telescopic mechanism includes substantially coaxial first and second tubular members. The first electrically powered linear actuator controls the longitudinal position of the first tubular member relative to the second tubular member. The means for absorbing the impact energy includes: (1) two or more folded metal straps; (2) at least one strap is fixed at one of its ends to a member which is fusibly connected to the first tubular member and to which is also connected a moving part of the said electrically powered linear actuator; (3) an adjacent edge of each of at least the first and second straps comprising an array of teeth or ramps; and (4) a pyrotechnically actuated means.

13 Claims, 7 Drawing Sheets

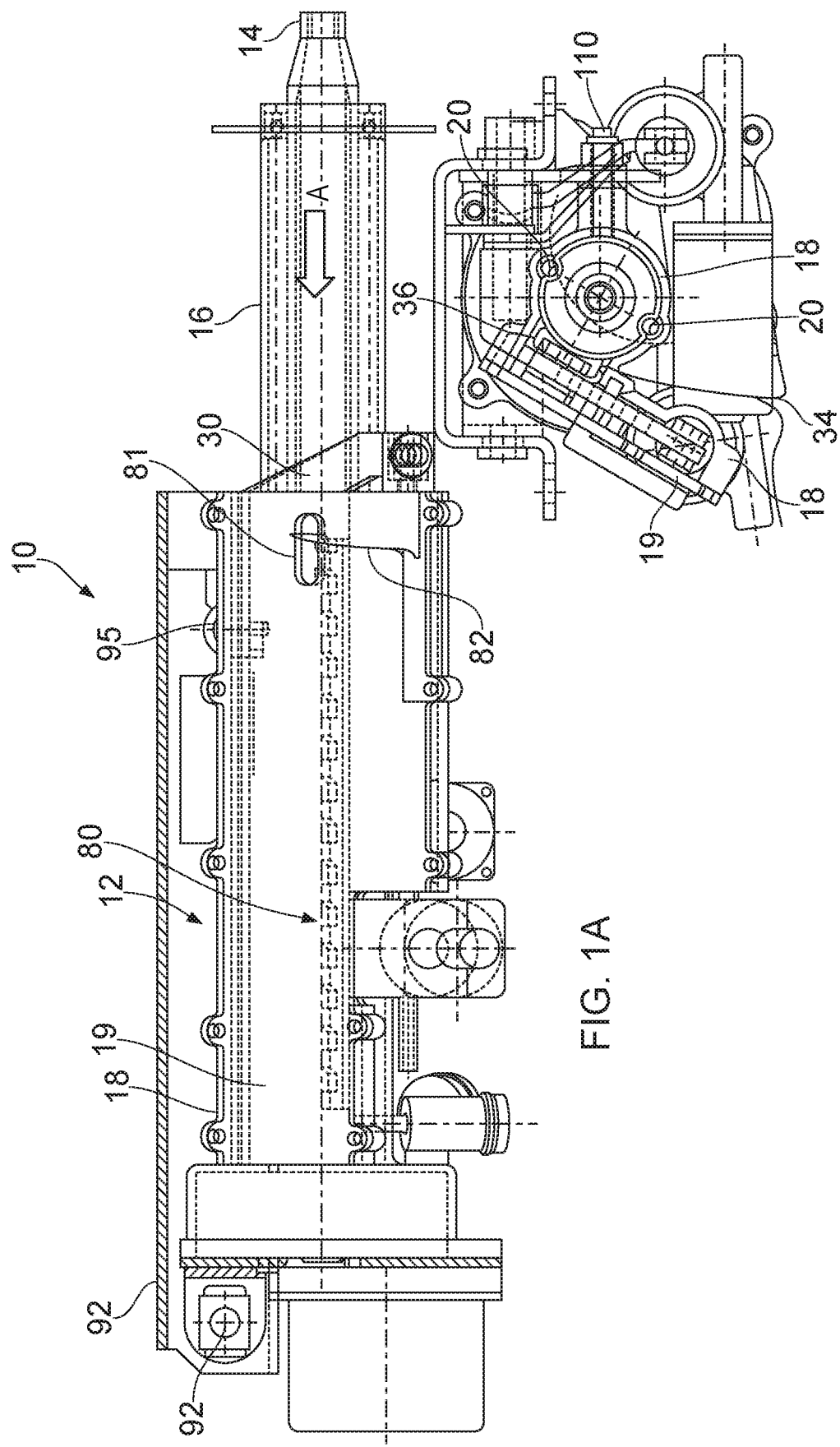

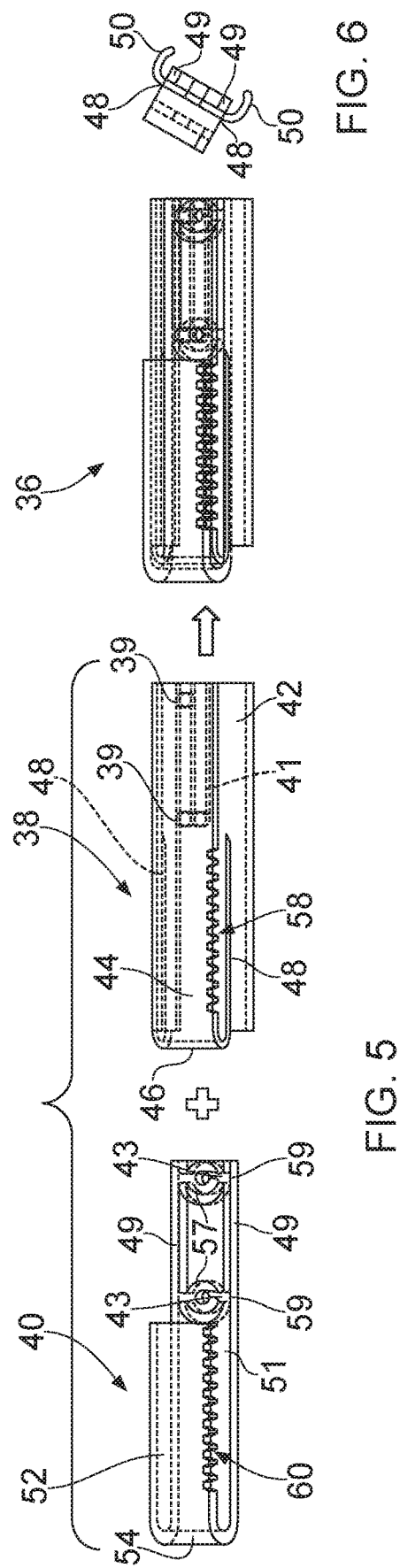

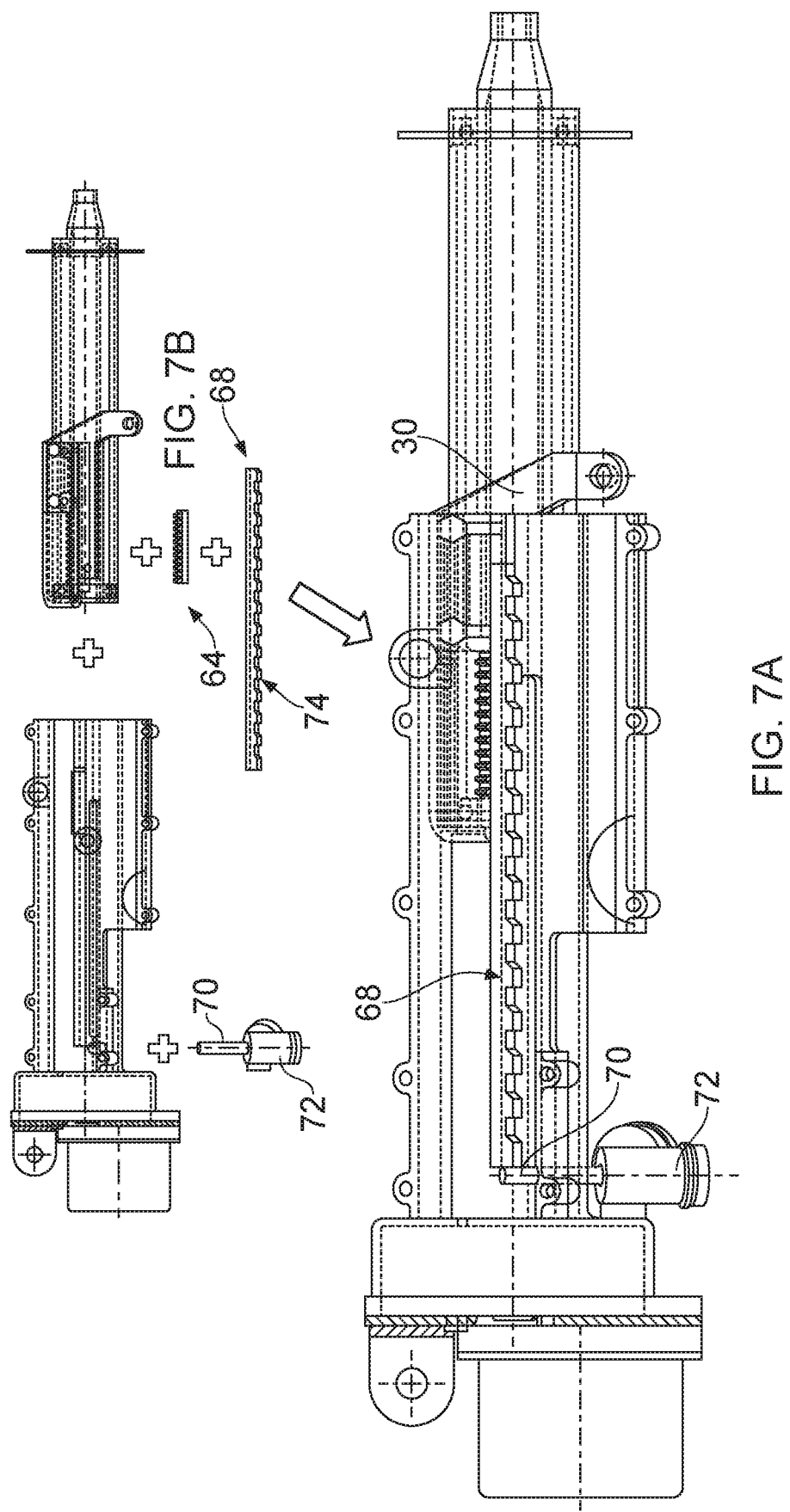

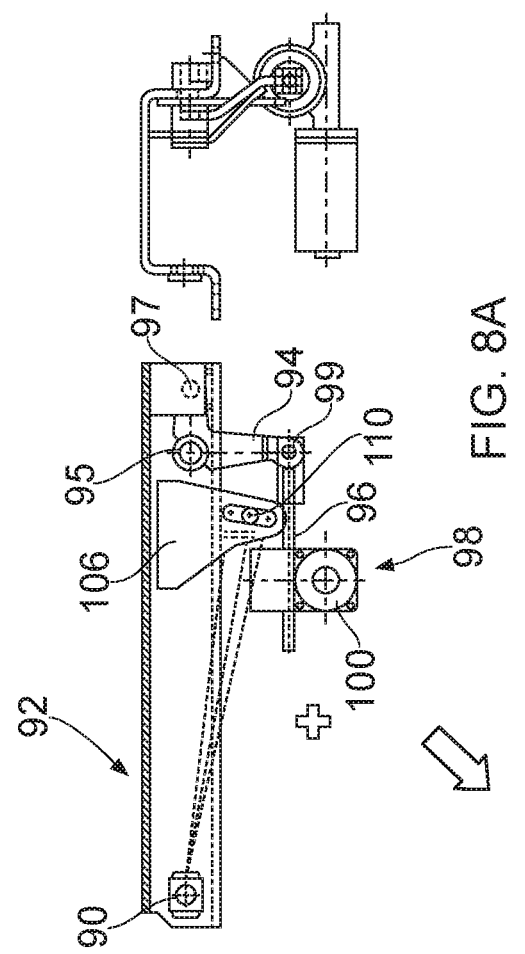
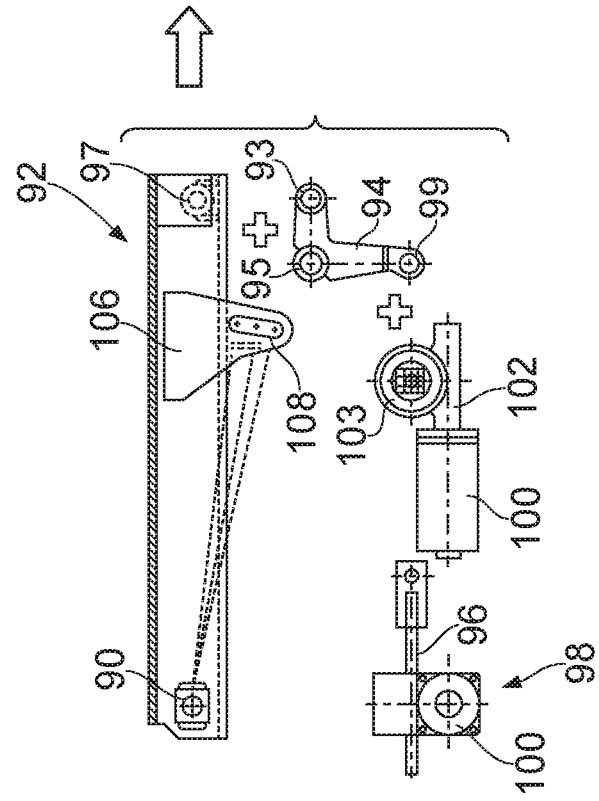

RETRACTABLE STEER-BY-WIRE STEERING COLUMN

CROSS-REFERENCE TO RELATED APPLICATION

This application claims priority to UK Patent Application No. 1819461.3, filed Nov. 29, 2019, the disclosure of which is incorporated herein by reference in its entirety.

TECHNICAL FIELD

The present invention relates to retractable steer-by-wire steering columns and in particular, but not exclusively, to steering column assemblies for use with a steer-by-wire hand wheel actuator.

BACKGROUND

Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering wheel (typically having a "steer-by-wire" operation) must be provided.

In such steer-by-wire arrangements, a hand wheel (steering wheel) is connected to one end of a shaft whose angular displacement is measured to generate a signal which is used to control the orientation of the steering wheels of the vehicle. The arrangement is commonly also provided with an electric motor connected to the shaft in order to provide a sensation of road feel to the driver.

However, it is also important for such arrangement to be collapsible in the event of a vehicle impact, to minimise injury to the driver.

SUMMARY

In accordance with the present invention a steering column for a vehicle comprises: a telescopic mechanism comprising substantially coaxial first and second tubular members; the first tubular member being guided for linear movement inside the second tubular member and housing a shaft adapted for attachment of a steering wheel; a first electrically powered linear actuator for controlling the longitudinal position of the first tubular member relative to the second tubular member; means for absorbing the impact energy transmitted between a driver and the steering wheel in a crash, comprising: two or more folded metal straps, at least one of the straps being fixed at one of its ends to a member which is fusibly connected to the first tubular member and to which is also connected a moving part of the said electrically powered linear actuator; an adjacent edge of each of at least the first and second straps comprising an array of teeth or ramps which are normally engaged with a retaining member which engages with the teeth or ramps of the at least first and second straps to constrain the first and second straps to move together; and a pyrotechnically actuated means for disengaging the first retaining member from the first and second straps.

With the above steering assembly, in the event of a vehicle impact, depending on the characteristics of the impact, at least one of the straps can be disconnected from the telescopic mechanism, if appropriate, thereby allowing alternative levels of crash energy absorption to be selected according to a control strategy, by actuation or non-actuation of the pyrotechnically actuated means.

The first and second straps are preferably secured to each other by additional means, e.g. by welding.

Preferably, the first retaining member comprises an array of teeth or ramps which are engageable with the teeth or ramps of the first and second straps.

In one embodiment, the steering column assembly further comprises a second retaining member which normally abuts the first retaining member to retain the first retaining member engaged with the first and second straps.

Preferably, a spring urges the second retaining member towards engagement with a pin of the pyrotechnically actuated means, the pin being withdrawn from engagement with the second retaining member on actuation of the pyrotechnically actuated means.

The steering column may further comprise a bellcrank lever and a second electrically powered linear actuator to provide height adjustment for the steering wheel.

The bellcrank lever may be mounted to the second, outer tubular member in a position which is substantially offset to one side of the centreline of the steering column.

The steering column may further comprise an electric motor fixed to the second, outer tubular member and whose rotor is connected to the steering wheel via a sliding joint between two shafts which can transmit torque with minimal torsional free play.

The steering column may further comprise an electric motor fixed to the second, outer tubular member and whose rotor is connected to the steering wheel via a reduction gearbox connected in series with a sliding joint between two shafts which can transmit torque with minimal torsional free play.

The steering column may further comprise an electric motor fixed to the second, outer tubular member and whose rotor is connected to the steering wheel via a reduction gearbox connected in series with a sliding joint between two shafts which can transmit torque with minimal torsional free play and in which the larger gear wheel of the reduction gearbox has inward facing teeth which are engaged with the external teeth of a smaller gear wheel which rotates with the motor rotor.

The body of the said electric motor may be mounted relative to the second, outer tubular member by a single fixing about which it can rotate and by one or more additional fixings which allow circumferential free play between the teeth of the two said gearwheels to be adjusted to zero or some other desired value.

The steering column may further comprise a mechanical device capable of limiting the rotations of the larger gear wheel to more than one rotation in total accommodated substantially within the envelope of space defined by its inward facing teeth.

BRIEF DESCRIPTION OF THE DRAWINGS

By way of example only, a specific embodiment of the present invention will now be described with reference to the accompanying drawings, in which:

FIG. 1a is a first side view, partly in cross-section, and an exploded view respectively of an embodiment of retractable steer-by-wire steering column assembly in accordance with the present invention;

FIG. 2 is an end view of the steering column of FIG. 1, looking in the direction of arrow A in FIG. 1;

FIG. 5 is a perspective view from above of first and second energy absorption straps which form part of the steering column of FIG. 3;

FIG. 6 is an end view of the first and second energy absorption straps of FIG. 5, when assembled;

FIG. 7a is a first side view of parts concerned with the energy absorption method in relation to the overall assembly;

FIG. 7b is an end view of the said parts in isolation, for clarity of parts concerned with the energy absorption method in relation to the overall assembly;

FIG. 8a is a first side view of a rake actuator assembly which forms part of the assembly of FIG. 1, shown assembled; and FIG. 8b is a second side view of a rake actuator assembly which forms part of the assembly of FIG. 1, shown in an exploded view.

DETAILED DESCRIPTION

Figure 1B:
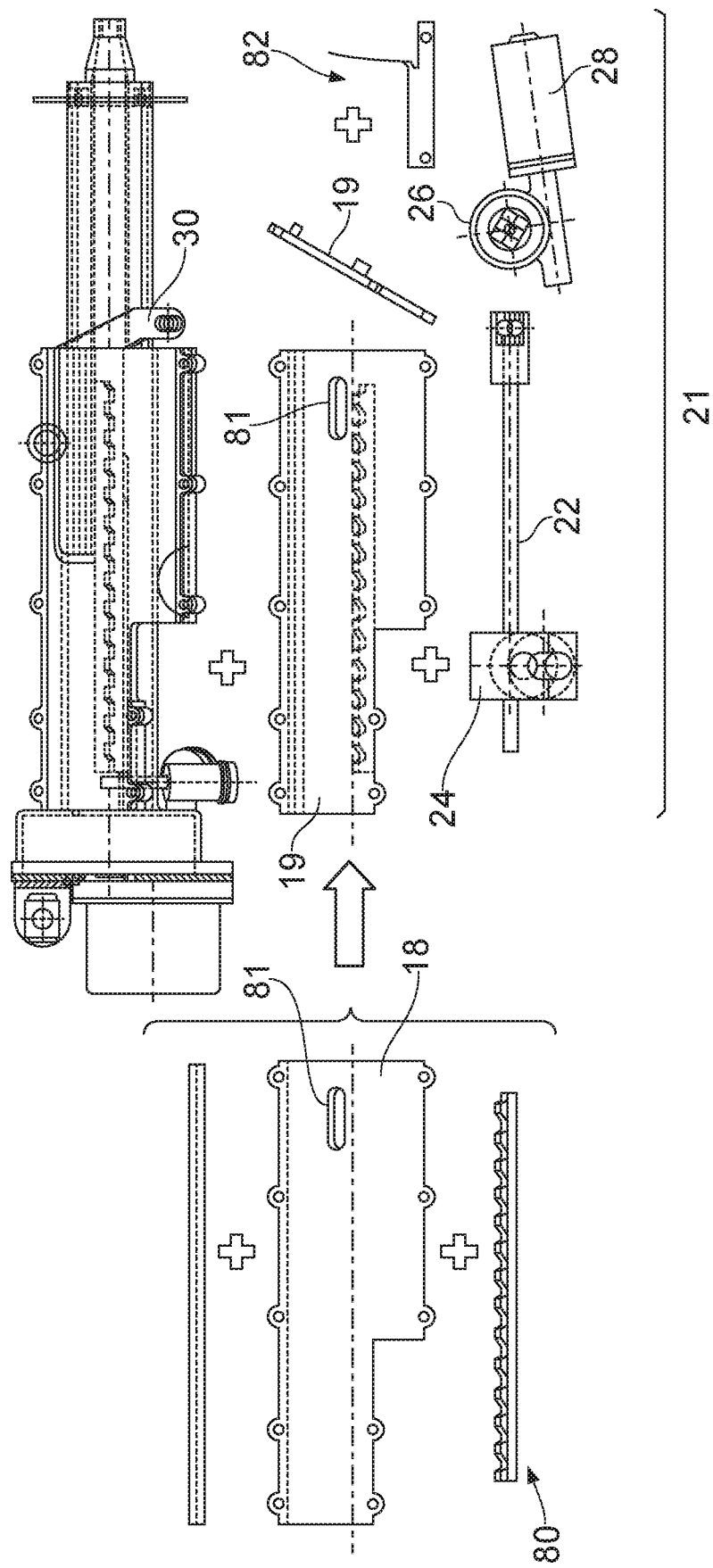
FIG. 1b is a second side view, partly in cross-section, and an exploded view respectively of an embodiment of retractable steer-by-wire steering column assembly in accordance with the present invention.
Figure 3B:
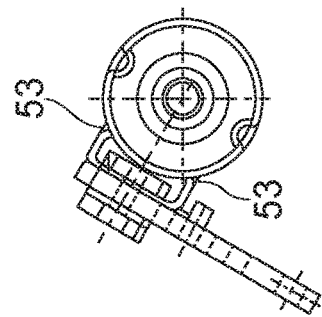
FIG. 3b is an end view of a steering column which forms part of the assembly of FIG. 1.
Figure 4:
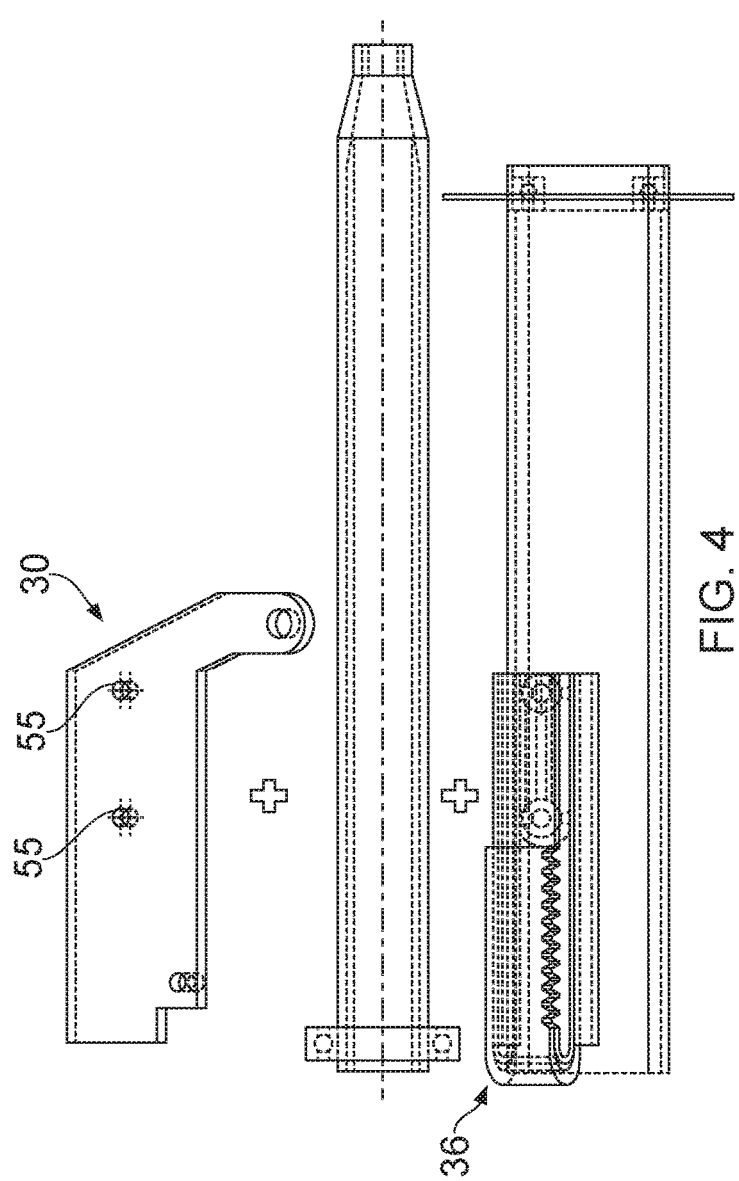
FIG. 4 is a partly exploded view of the steering column of FIG. 3.
Figure 3A:
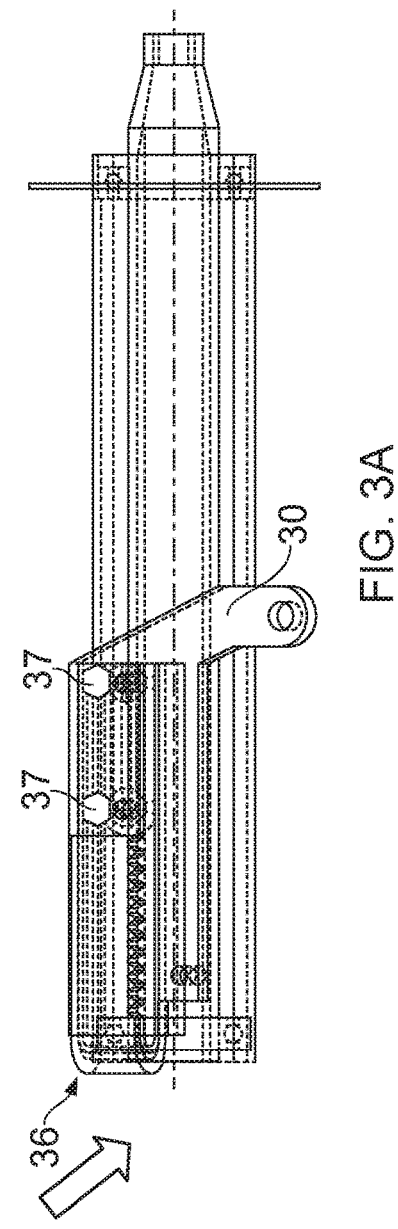
FIG. 3a is a side view of a steering column which forms part of the assembly of FIG. 1.
Figure 7C:
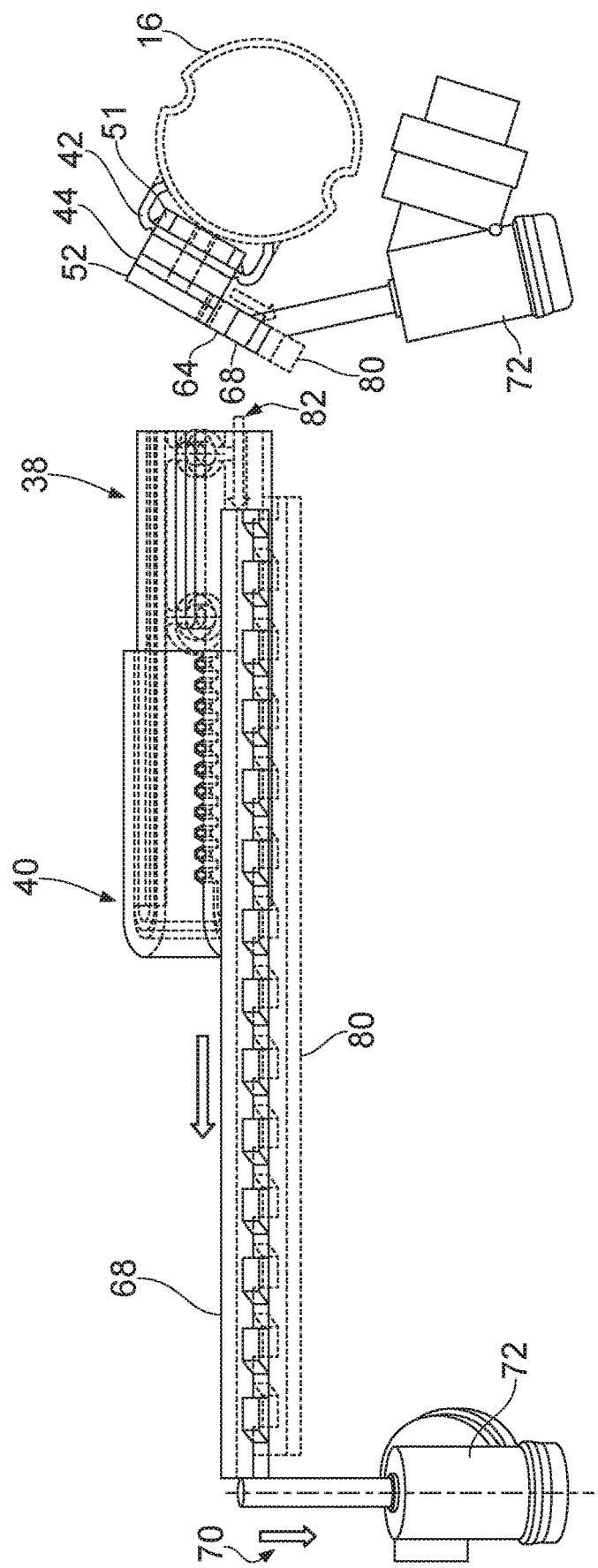
FIG. 7c is a second side view of parts concerned with the energy absorption method in relation to the overall assembly.

FIG. 1a is a side view, partly in cross-section, through a steering column assembly 10 in which the centreline axis of a steering column 12 is rotated by approximately 24° clockwise so that the centreline axis of the steering column extends horizontally in the drawing, for ease of illustration. The steering column assembly 10 is located between the firewall of the vehicle, a vehicle instrument panel and the knee space below the column assembly 10.

In use, a steering wheel (not shown) is fixed to the rearmost end (i.e. the right-hand end as shown in FIG. 1) of a shaft 14 which is rotatably mounted within, and extends from, an inner column tube 16. The inner column tube 16 is displaceable inwardly and outwardly along its longitudinal axis with respect to a cast metal steering column housing 18, as will be explained, in order to adjust the "reach" of the steering wheel. In the particular embodiment shown, the inner column tube 16 runs on two linear arrays of ball bearings 20, but as an alternative the inner column tube may be a close sliding fit within the housing 18.

As best seen in FIG. 1b, a reach/retraction actuator 21 comprising an elongate threaded leadscrew 22 is mounted between the inner column tube 16 and the column housing 18. The leadscrew 22 extends parallel to the longitudinal axis of the steering column assembly and is threaded through a lead nut 24 (not visible) which is rotatably mounted within a first reduction gearbox 26 in which it is driven by a worm gear. The rotation of the lead nut 24 results in longitudinal displacement of the leadscrew 22. The worm gear is engaged with a worm screw which is connected to the output of an electric motor 28. As will be explained, the leadscrew 22 is attached to the inner column tube 16 by means of a reach arm plate 30 so that actuation of the electric motor 28 results in displacement of the inner column tube 16 inwardly or outwardly, in order to adjust the "reach" of the steering wheel.

As best seen in FIG. 2, the cross section of the column housing 18 is incomplete for most of its length, leaving an elongate opening 34 on its upper left side (when viewed in FIG. 2). The elongate opening 34 receives an energy absorption strap assembly 36, which will be described in more detail, which spans the width of the elongate opening and which, if there is a sliding fit between the inner column tube 16 and a column housing 18 (i.e. if the ball bearings 20 are omitted), prevents rotation of the inner column tube 16 with respect to the column housing 18.

Referring to FIGS. 3 to 8, the energy absorption strap assembly 36 comprises first and second energy absorption straps 38, 40. The first energy absorption strap 38 takes the form of a partially U-shaped metal bracket having a lower elongate rectangular flanged leg 42, and an upper elongate rectangular planar leg 44 overlying and extending parallel to the first leg 42, with the two portions being joined by a semi-circular nose portion 46. The lower leg 42 is wider than the upper leg 44 and is provided with two identical parallel deep grooves 48 extending from the junction of the lower leg 42 and the rounded nose portion 46 in a direction parallel to the longitudinal axis for about two thirds of the length of the lower leg 42. As best seen in FIG. 6, the two elongate parallel lateral edges of the lower leg 42 are folded downwardly and underneath the lower leg 42 to form two elongate flanges 50. In this way, the position of the reach arm plate 30, as determined by actuation of the reach/retraction actuator, determines the position of the inner column tube 16.

The second energy absorption strap 40 also takes the form of a partially U-shaped metal bracket having a lower elongate rectangular planar leg 51 and a shorter upper elongate rectangular planar leg 52 overlying and extending parallel to the front portion of the lower leg 51, with the two portions being joined by a semi-circular nose portion 54. The spacing between the inner faces of the lower and upper legs 51, 52 of the second energy absorption strap 40 corresponds to the spacing between the outer faces of the lower and upper legs 42, 44 of the first energy absorption strap 38 and the internal diameter of the nose portion 54 of the second energy absorption strap 40 corresponds to the external diameter of the nose portion 46 of the first energy absorption strap 38. In normal use, the first energy absorption strap 38 is nested between the lower and upper legs 51, 52 of the second energy absorption strap 40 and the two straps 40 and 38 are joined to each other by welding along edges 49. The flanges 50 are subsequently welded to the outer surface of the inner column tube 16 along edges 53 shown in FIG. 3b. The outer face of the upper planar leg 44 is also welded to the reach arm plate 30. The reach arm plate 30 is attached to the energy absorption strap assembly 36 by two screws 37 which pass through plain holes 39 in upper leg 44 then through plain holes 55 in the reach arm plate 30 then through slot 41 in lower leg 42 and are engaged with threaded holes 43 in lower leg 51. The threaded holes 43 are formed through substantially circular portions 57 of the lower leg 51 which can break away at a prescribed force by the fracturing of fusible connection "bridges" 59. The circular portions 57 therefore act as shearable nuts which, in combination with the slot 41 in lower leg 42 of the first energy absorption strap 38, allow the lower legs 51, 42 (which are welded together at positions 49) to move forwards with the inner column tube 16 in a crash while the upper leg 44 of the first energy absorption strap 38 and the reach arm 30 both remain stationary with respect to the lead screw 22.

It will be observed in FIG. 6 that one edge of the upper legs 44, 52 of the first and second energy absorption straps 38, 40 respectively is formed into an identical rack portion 58, 60 formed from a plurality of identical teeth which, when the first energy absorption strap 38 is nested within the second energy absorption strap 40, are accurately aligned and are engaged with a complementarily-shaped removable first rack 64 (FIG. 7b) which is as thick as the combined thicknesses of the first and second rack portions 58, 60 and, when engaged with the rack portion is 50, 60, locks the upper legs 44, 52 of the first and second energy absorption straps 38, 40 together.

The underside of the removable first rack 64 is flat and smooth out and abuts the flat and smooth upper face of a second removable rack 68. The second rack 68 is longer than the first rack and extends forwardly until its front edge abuts the retractable pin 70 of a pyrotechnic device 72. The pin is 70 configured to be withdrawn very rapidly on actuation of the pyrotechnic device, in response to a signal from an electronic control unit.

The underside of the second rack 68 is provided with an array 74 of teeth or ramps which engage with a complementary array 76 of teeth or ramps formed in the upper face of a third rack 80 seen in FIG. 1b which is permanently but immovably secured to the inner face of the column cover 19 over the elongate opening 34 in the column housing 18. The second rack 68 is urged in the forward direction by means of a leaf-type pre-load spring 82 mounted on the column housing 18, the upper end of the spring passing through a hole 81 in the column cover 19.

If the pin 70 of the pyrotechnic device 72 is withdrawn, which would occur in the event that a crash situation has been detected, the second rack 68 is urged forwardly by the preload spring 82 and the initial tip-on-tip engagement of the arrays 74, 76 of the teeth or ramps on the second rack 68 and the third rack 80 collapses to a tooth-in-gap engagement position results in a downward motion of the second rack towards the third rack a few millimetres. Once the second rack 68 has moved downwards, the first rack 64 which links the upper legs 44, 52 of the first and second energy absorption straps 38, 40 together becomes disengaged from the first and second energy absorption straps.

The second energy absorption strap 40 is not now deformed when the inner column tube travels forwards during the crash stroke since its upper leg 52 is free to move simultaneously with its lower leg 51.

The above arrangement provides an adaptive crash function, whereby two different levels of energy absorption can be selected via the activation or non-activation of the pyrotechnic device 72.

In a first setting, the pin 70 of the pyrotechnic device 72 is not actuated in the event of a crash, with the result that the first and second energy absorption straps 38, 40 are locked together by means of the first rack 64. Forward motion of the steering wheel and therefore of the inner column tube 16 results in the central portion of the first energy absorption strap 38 being torn away from the side portions along the grooves 48, converting some of the driver's kinetic energy into strain energy. In addition, as the central portion of the first energy absorption strap is torn away from the side portions, the fold travels along its length, thereby absorbing additional kinetic energy.

If the first and second energy absorption straps 38, 40 are locked together by the first rack 64, the second energy absorption strap deforms simultaneously in the event of a crash, thereby absorbing further energy from the driver.

In a second setting, the pin 70 of the pyrotechnic device 72 is actuated to disengage it from the second rack, which results in disengagement of the first rack 64 from the first and second energy absorption straps 38, 40, as explained previously. In the second setting, forward motion of the steering wheel and the inner column tube 16 still results in the central portion of the first energy absorption strap 38 being torn away from the side portions along the grooves 48. However, the second energy absorption strap is not deformed and continues to move forwardly with the inner column tube 16 without being deformed.

It will also be observed that the column housing 18 is pivotally mounted at its front end by means of a pivot 90 to a mounting bracket 92 which is secured to the vehicle. Towards the rearmost end of the column, the fulcrum 95 of a bell crank 94 is pivotally mounted to the column housing 18 and the rearmost end 93 of the horizontal arm of the be crank is pivotally mounted to the mounting bracket 92. The vertical arm of the bell crank 94 is pivotally mounted at 99 to one end of a lead screw 96 of a rake actuator 98 having an electric motor 100 with an output connected to a worm screw 102 (not visible) engaged with a worm gear 103 (not visible) which is threadably engaged with a non-rotating lead screw 96. By actuation of the electric motor 100, the lead screw 96 can be displaced along its longitudinal axis in both directions, which adjusts the angular position of the bell crank 94 and which in turn sets the inclination or "rake" of the column housing 18. A rake guide plate 106 is connected to, and extends downwardly from, the mounting bracket 92 and is provided with a curved aperture 108 which receives a pin 110 secured to the column housing 18, to assist in guiding the pivotal adjustment of the column housing 18.

What is claimed is:

1. A steering column for a vehicle, comprising:
   a telescopic mechanism comprising substantially coaxial first and second tubular members;
   the first tubular member being guided for linear movement inside the second tubular member and housing a shaft adapted for attachment of a steering wheel;
   a first electrically powered linear actuator for controlling the longitudinal position of the first tubular member relative to the second tubular member;
   means for absorbing the impact energy transmitted between a driver and the steering wheel in a crash, comprising:
   two or more folded metal straps,
   at least one of the straps being fixed at one of its ends to a member which is fusibly connected to the first tubular member and to which is also connected a moving part of the said electrically powered linear actuator;
   an adjacent edge of each of at least the first and second straps comprising an array of teeth or ramps which are normally engaged with a first retaining member which engages with the teeth or ramps of the at least first and second straps to constrain the first and second straps to move together; and
   a pyrotechnically actuated means for disengaging the first retaining member from the first and second straps.

2. The steering column as defined in claim 1, wherein the first and second straps are secured to each other by additional means.

3. The steering column as defined in claim 2, wherein the first and second straps are welded to each other.

4. The steering column as defined in claim 2, wherein the first retaining member comprises an array of teeth or ramps which are engageable with the teeth or ramps of the first and second straps.

5. The steering column as defined in claim 4, comprising a second retaining member which normally abuts the first retaining member to retain the first retaining member engaged with the first and second straps.

6. The steering column as defined in claim 5, comprising a spring for urging the second retaining member towards engagement with a pin of the pyrotechnically actuated means, the pin being withdrawn from engagement with the second retaining member on actuation of the pyrotechnically actuated means.

7. The steering column as defined in claim 2, further comprising a bellcrank lever and a second electrically powered linear actuator to provide height adjustment for the steering wheel.

8. The steering column as defined in claim 7, in which the bellcrank lever is mounted to the second, outer tubular member in a position which is substantially offset to one side of the centreline of the steering column.

9. The steering column as defined in claim 2, further comprising an electric motor fixed to the second, outer tubular member and whose rotor is connected to the steering wheel via a sliding joint between two shafts which can transmit torque with minimal torsional free play.

10. The steering column as defined in claim 2, further comprising an electric motor fixed to the second, outer tubular member and whose rotor is connected to the steering wheel via a reduction gearbox connected in series with a sliding joint between two shafts which can transmit torque with minimal torsional free play.

11. The steering column as defined in claim 2, further comprising an electric motor fixed to the second, outer tubular member and whose rotor is connected to the steering wheel via a reduction gearbox connected in series with a sliding joint between two shafts which can transmit torque with minimal torsional free play and in which the larger gear wheel of the reduction gearbox has inward facing teeth which are engaged with the external teeth of a smaller gear wheel which rotates with the motor rotor.

12. The steering column as defined in claim 11, in which the body of the said electric motor is mounted relative to the second, outer tubular member by a single fixing about which it can rotate and by one or more additional fixings which allow circumferential free play between the teeth of the two said gearwheels to be adjusted to zero or some other desired value.

13. The steering column as defined in claim 11, further comprising a mechanical device capable of limiting the rotations of the larger gear wheel to more than one rotation in total accommodated substantially within the envelope of space defined by its inward facing teeth.

\* \* \* \* \*